US008914877B2

(12) United States Patent
Lin et al.

(10) Patent No.: US 8,914,877 B2
(45) Date of Patent: Dec. 16, 2014

(54) HANDHELD DEVICE AND METHOD FOR UNLOCKING THE HANDHELD DEVICE (71) Applicant: Hon Hai Precision Industry Co., Ltd., New Taipei (TW)

(72) Inventors: Shu-Cheng Lin, New Taipei (TW); Chun-Wei Kuo, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 31 days.

(21) Appl. No.: 13/887,386

(22) Filed: May 6, 2013

(65) Prior Publication Data

US 2014/0053258 A1 Feb. 20, 2014

(30) Foreign Application Priority Data

Aug. 16, 2012 (TW) .............................. 101129735 A (51) Int. Cl.
*G06F 21/31* (2013.01)
(52) U.S. Cl.
CPC ...................................... *G06F 21/31* (2013.01)
USPC ........................................................... 726/19
(58) Field of Classification Search
CPC ....................................................... G06F 21/31
USPC ............................................................ 726/19
See application file for complete search history.

(56) References Cited

U.S. PATENT DOCUMENTS

| 2008/0134317 | A1 | 6/2008 | Boss et al. |
| 2011/0191838 | A1 | 8/2011 | Yanagihara |
| 2013/0283165 | A1* | 10/2013 | Hua ............................. 715/727 |

FOREIGN PATENT DOCUMENTS

CN          102096546 A       6/2011

* cited by examiner

*Primary Examiner* — Jacob Lipman
(74) *Attorney, Agent, or Firm* — Novak Druce Connolly Bove + Quigg LLP (57) ABSTRACT A method for unlocking a handheld device with a touch screen includes accessing a social network using login information, acquiring information of a plurality of friends from the social network. The method further includes creating an unlocking interface on the touch screen according to a second amount of a secondary key based on the plurality of friends and a question based on the first amount of a primary key based on the plurality of friends. An input event of a user on the unlocking interface is detected the handheld device is transitioned from a lock state to an unlock state upon the condition that the input event corresponds to a correct answer.

16 Claims, 7 Drawing Sheets

HANDHELD DEVICE AND METHOD FOR UNLOCKING THE HANDHELD DEVICE

BACKGROUND

1. Technical Field

Embodiments of the present disclosure generally relate to user interfaces that employ touch-sensitive displays, and more particularly to a handheld device and a method for unlocking the handheld device.

2. Description of Related Art

Touch screens are becoming more and more popular for use as displays and as user input devices on handheld devices, such as mobile telephones and personal digital assistants (PDAs).

Handheld devices with touch screens may be unlocked by any of several well-known unlocking procedures, such as pressing a predefined set of buttons (simultaneously or sequentially), entering a password or an input event. These unlock procedures, however, have drawbacks. The button combinations may be hard to perform. Creating, memorizing, and recalling passwords, input events and the like can be quite burdensome. These drawbacks may reduce the ease of use of the unlocking process and, as a consequence, the ease of use of the handheld device in general.

DETAILED DESCRIPTION

The application is illustrated by way of examples and not by way of limitation in the figures of the accompanying drawings in which like references indicate similar elements. It should be noted that references to "an" or "one" embodiment in this disclosure are not necessarily to the same embodiment, and such references mean at least one.

In general, the word "module" as used hereinafter, refers to logic embodied in hardware or firmware, or to a collection of software instructions, written in a programming language, such as, for example, Java, C, or assembly. One or more software instructions in the modules may be embedded in firmware such as in an EPROM. It will be appreciated that modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
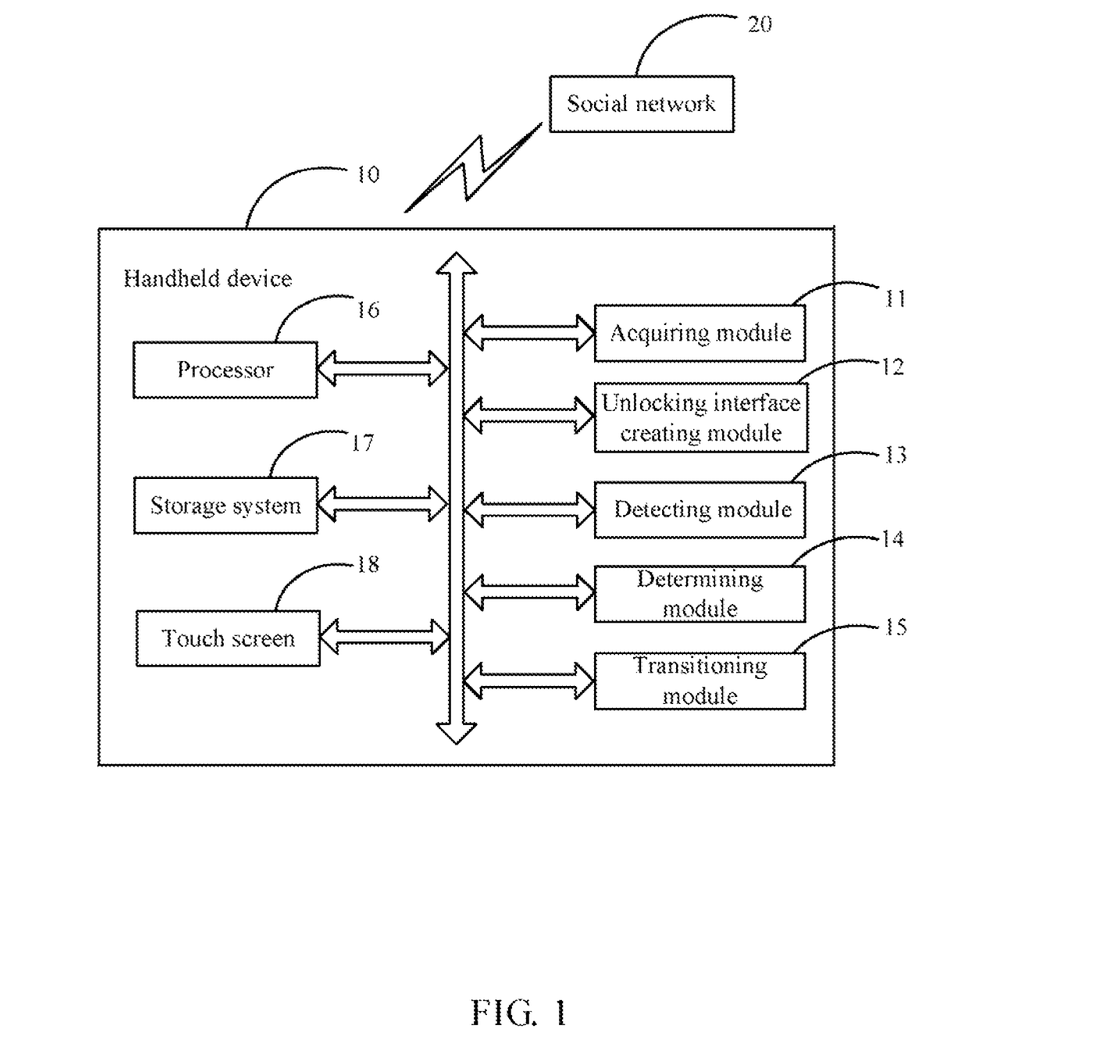
FIG. 1 is a block diagram of one embodiment of functional modules of a network device in accordance with the present disclosure.

FIG. 1 is a block diagram of one embodiment of functional modules of a network device 10 in accordance with the present disclosure. In the present embodiment, the handheld device 10 may be a cell phone and a personal computer (PC), for example. The handheld device 10, using the information in a social network to create an unlocking interface, for example, is easy and convenient for a user to unlock the handheld device 10 or an important file stored in the handheld device 10.

In the present embodiment, the handheld device 10 includes an acquiring module 11, an unlocking interface creating module 12, a detecting module 13, a determining module 14, a transitioning module 15, a processor 16, a storage system 17 and a touch screen 18. The modules 11-15 may comprise computerized code in the form of one or more programs that are stored in the storage system 17. The computerized code includes instructions that are executed by the processor 16 to provide functions for the modules 11-15. In one example, the storage system 17 may include a hard disk drive, a flash memory, a cache or another computerized memory device.

The acquiring module 11 accesses a social network 20 by login information stored in the storage system 17 and acquires information of a plurality of friends in the social network 20 according to the login information. In the present embodiment, the social network 20 may be FACEBOOK, TWITTER, or FLICKR, for example. The login information includes a website, an user name and a password related to the social network 20. In one embodiment, the acquiring module 11 may update the information stored in the storage system 17 according to the changes of information in the social network 20. The information of the plurality of friends in the social network 20 includes a primary key and a secondary key. The primary key is selected from the group comprising a photo and a video uploaded by a friend in the social network 20, the name of the friend, messages and description related to the friend, and the secondary key is selected from the group at least comprising an image of the friend. In the present embodiment, the image of the friend may be a head portrait captured by a camera, a photo of the friend, a group photo related to friends in the social network 20 and other pictures representing the friend.

In the present embodiment, when the detecting module 13 detects an input event of a user on the touch screen 18, the unlocking interface creating module 12, from the storage system 17, selects a first amount of the primary key related to a friend in the social network 20, and a second amount of a secondary key related to the friend plus a secondary key unrelated to the friend. Then, the unlocking interface creating module 12 creates an unlocking interface on the touch screen 18 according to the second amount of the secondary key and a question based on the first amount of the primary key. The determining module 14 determines whether the input event corresponds to an answer linked with the question, and the transitioning module 15 transitions the handheld device from a lock state to an unlock state upon the condition that the input event corresponds to the answer. If the input event does not correspond to the answer, the transitioning module 15 keeps the handheld device 10 in the lock state. Consequently, the unlocking interface creating module 12 creates a new unlocking interface, and the transitioning module 15 locks the handheld device 10 permanently if the determining module 14 determines that the user has failed over predefined times. The predefined times can be set by a user of the handheld device 10 to prevent exhausting tries to unlock the handheld device 10.

The following takes four examples to introduce the present disclosure in detail.

Figure 2:
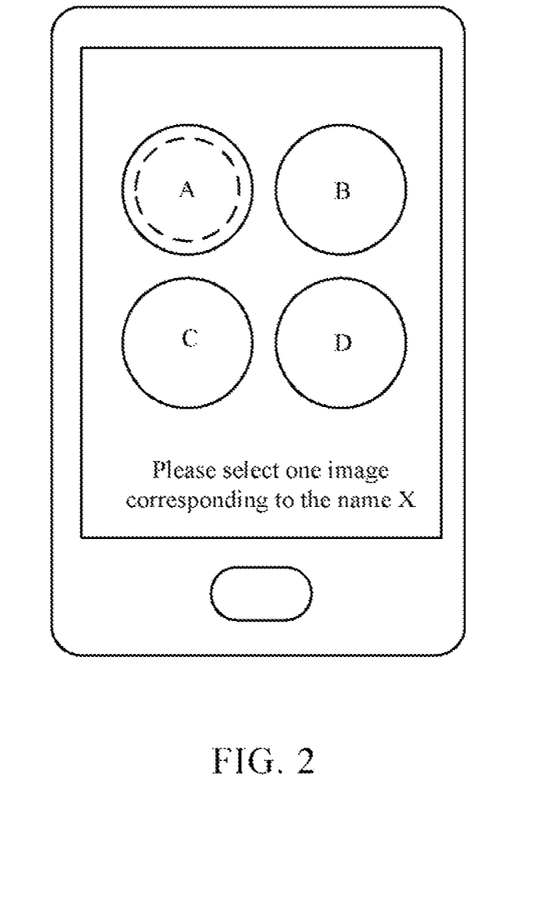
FIG. 2 is a schematic diagram of one embodiment of creating an unlocking interface by an unlocking interface creating module of the handheld device in FIG. 1.

FIG. 2 is a schematic diagram of one embodiment of creating an unlocking interface by the unlocking interface creating module 12 of the handheld device 10 in FIG. 1. In the present embodiment, the unlocking interface creating module 12 selects one primary key and four secondary keys used to create an unlocking interface. The primary key is the name X of a recent contacting friend in the social network 20, and the secondary keys include an image A related the friend and images B, C and D related to other friends in the social network 20. The question refers to selecting one of the images A, B, C and D that corresponds to the name X of the friend, such as which images relates to X or please pick out an image corresponding to X. The answer corresponding to the question refers to clicking the image A. When the detecting module 13 detects an input event, the handheld device 10 provides an unlocking interface as showed in FIG. 2 on the touch screen 18 at the same time. If the input event refers to clicking the image A, the input event corresponds to the answer and then the transitioning module 15 unlocks the handheld device 10 at once. If the input event does not correspond to the answer, the transitioning module 15 keeps the handheld device in the lock state and the handheld device 10 provides a new unlocking interface on the touch screen 18.

Figure 3:
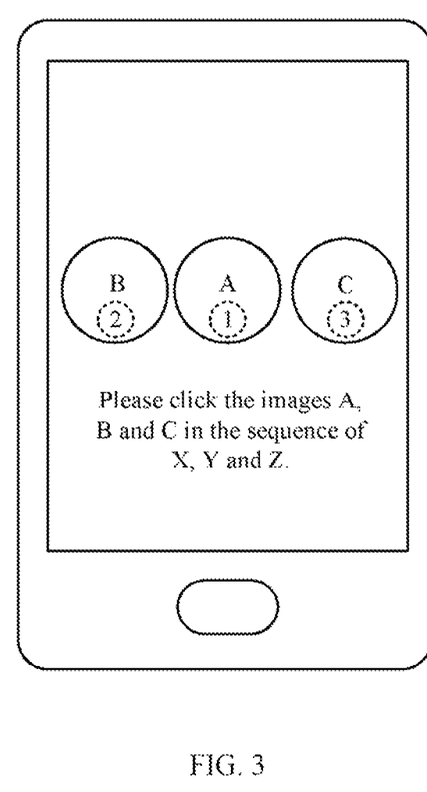
FIG. 3 is a schematic diagram of another embodiment of creating an unlocking interface by an unlocking interface creating module of the handheld device in FIG. 1.

FIG. 3 is a schematic diagram of another embodiment of creating an unlocking interface by the unlocking interface creating module 12 of the handheld device 10 in FIG. 1. In the present embodiment, the unlocking interface creating module 12 selects three primary keys and three secondary keys used to create an unlocking interface. The primary keys are the names X, Y and Z of recent contacting friends in the social network 20, and the secondary keys include images A, B and C corresponding to the names X, Y and Z respectively. The question refers to clicking the images A, B and C in the sequence of X, Y and Z. When the detecting module 13 detects an input event, the handheld device 10 provides an unlocking interface as showed in FIG. 3 on the touch screen 18 at the same time. If the input event refers to clicking the images A, B and C in the sequence of X, Y and Z, the input event corresponds to the answer and then the transitioning module 15 unlocks the handheld device 10 at once. If the input event does not correspond to the answer, the transitioning module 15 keeps the handheld device in the lock state and the handheld device 10 provides a new unlocking interface on the touch screen 18.

Figure 4:
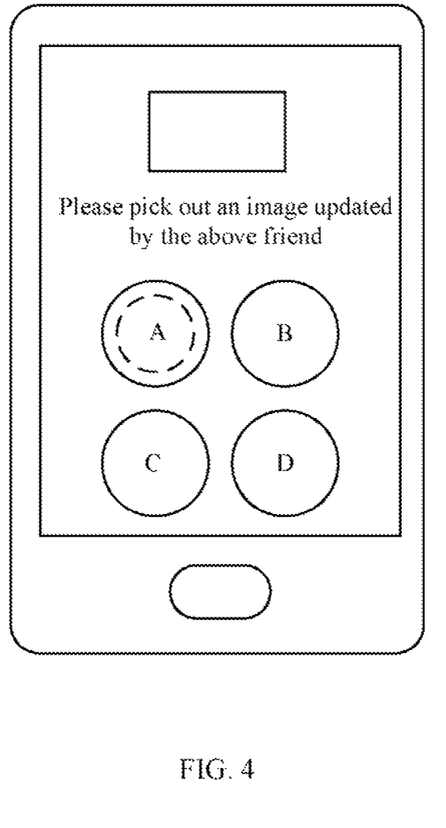
FIG. 4 is a schematic diagram of another embodiment of creating an unlocking interface by an unlocking interface creating module of the handheld device in FIG. 1.

FIG. 4 is a schematic diagram of another embodiment of creating an unlocking interface by the unlocking interface creating module 12 of the handheld device 10 in FIG. 1. In the present embodiment, the unlocking interface creating module 12 selects one primary key and four secondary keys used to create an unlocking interface. The primary keys is a photo of a recent contacting friend in the social network 20, and the secondary keys include images A, B, C and D. The image A is updated by the friend, and the images B, C and D are updated by other friends in the social network 20. The question refers to selecting one of the images A, B, C and D which is updated by the friend, such as which images is updated by the friend or please pick out an image updated by the friend. The answer corresponding to the question refers to clicking the image A. When the detecting module 13 detects an input event, the handheld device 10 provides an unlocking interface as showed in FIG. 4 on the touch screen 18 at the same time. If the input event refers to clicking the image A as showed by broken line in FIG. 4, the input event corresponds to the answer and then the transitioning module 15 unlocks the handheld device 10 at once. If the input event does not correspond to the answer, the transitioning module 15 keeps the handheld device in the lock state and the handheld device 10 provides a new unlocking interface on the touch screen 18.

Figure 5:
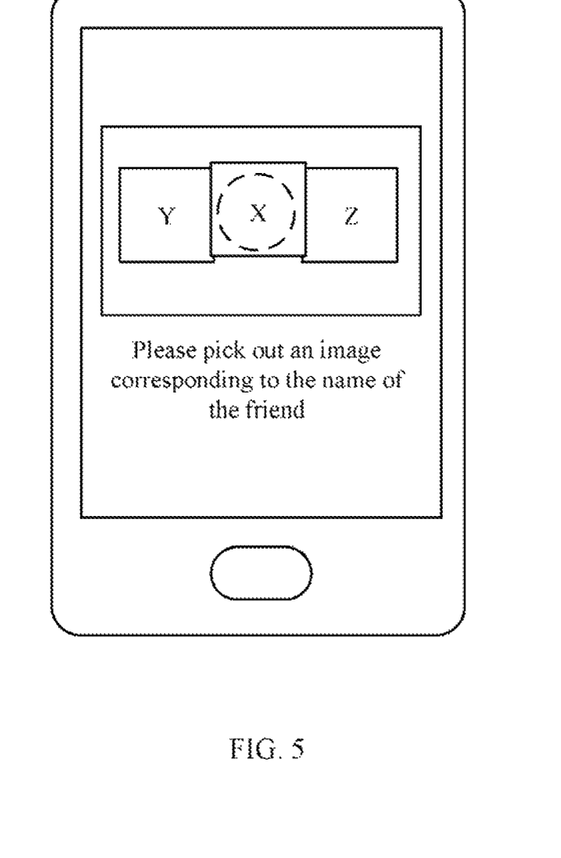
FIG. 5 is a schematic diagram of another embodiment of creating an unlocking interface by an unlocking interface creating module of the handheld device in FIG. 1.

FIG. 5 is a schematic diagram of another embodiment of creating an unlocking interface by the unlocking interface creating module 12 of the handheld device 10 in FIG. 1. In the present embodiment, the unlocking interface creating module 12 selects one primary key and one secondary key used to create an unlocking interface. The primary key is the name of a friend X in the social network 20, and the secondary key is a group photo including the images of X, Y and Z. The group photo is divided into three parts by lines, and each part corresponds to one of the images of X, Y and Z as showed in FIG. 5. The question refers to selecting one of the images A, B and C which corresponds to the name of the friend, such as which images corresponds to the name of the friend or please picks out an image corresponding to the name of the friend. The answer corresponding to the question refers to clicking the image A. When the detecting module 13 detects an input event, the handheld device 10 provides an unlocking interface as showed in FIG. 5 on the touch screen 18 at the same time. If the input event refers to clicking the image A as showed by broken line in FIG. 5, the input event corresponds to the answer and then the transitioning module 15 unlocks the handheld device 10 at once. If the input event does not correspond to the answer, the transitioning module 15 keeps the handheld device in the lock state and the handheld device 10 provides a new unlocking interface on the touch screen 18.

In one embodiment, questions and amount of the primary key and the secondary key can be adjusted by a user.

Figure 6:
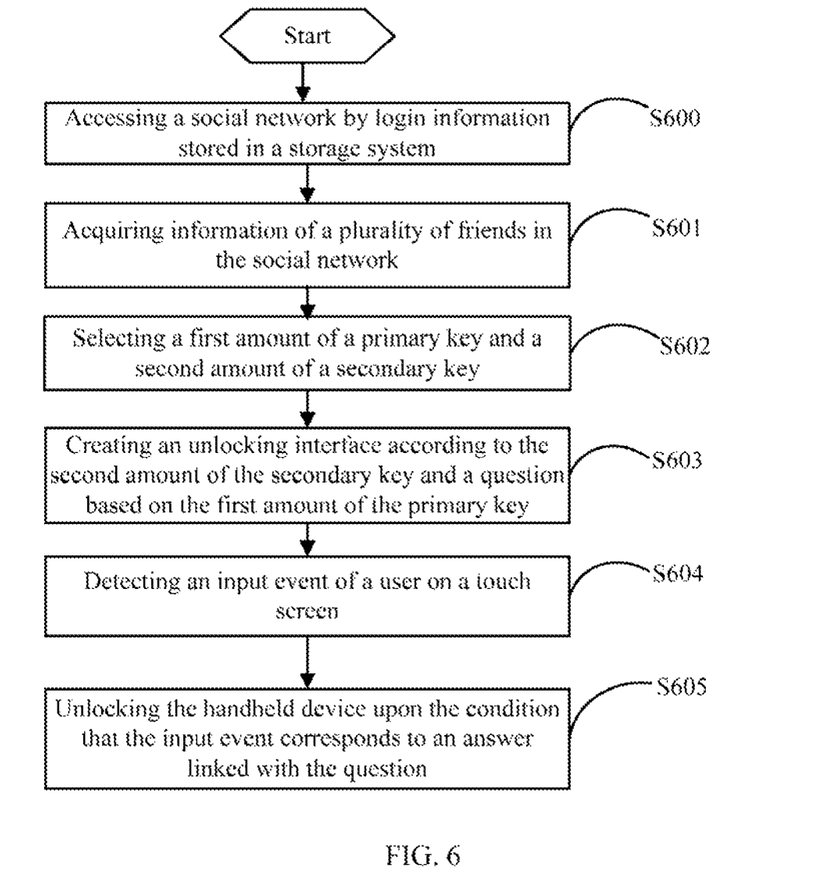
FIG. 6 is a flowchart of one embodiment of a method for unlocking a handheld device.

FIG. 6 is a flowchart of one embodiment of a method for unlocking the handheld device 10. In one embodiment, the method functions by the modules in FIG. 1 in the manner following.

In block S600, the acquiring module 11 accesses a social network 20 by login information stored in the storage system 17. In the present embodiment, the social network 20 may be FACEBOOK, TWITTER, or FLICKR, for example. The login information includes a website, a user name and a password related to the social network 20.

In block S601, the acquiring module 11 acquires information of a plurality of friends in the social network 20. The information of the plurality of friends in the social network 20 includes a primary key and a secondary key. The primary key is selected from the group comprising a photo and a video uploaded by a friend in the social network 20, the name of the friend, messages and description related to the friend, and the secondary key is selected from the group at least comprising an image of the friend.

In block S602, the unlocking interface creating module 12 selects a first amount of the primary key and a second amount of the secondary key from the storage system 17.

In block S603, the unlocking interface creating module 12 creates an unlocking interface on the touch screen 18 according to the second amount of the secondary key and a question based on the first amount of the primary key.

In block S604, the detecting module 13 detects an input event of a user on the touch screen 18.

In block S605, the determining module 14 determines whether the input event corresponds to an answer linked with the question, and the transitioning module 15 transitions the handheld device from a lock state to an unlock state upon the condition that the input event corresponds to the answer.

Figure 7:
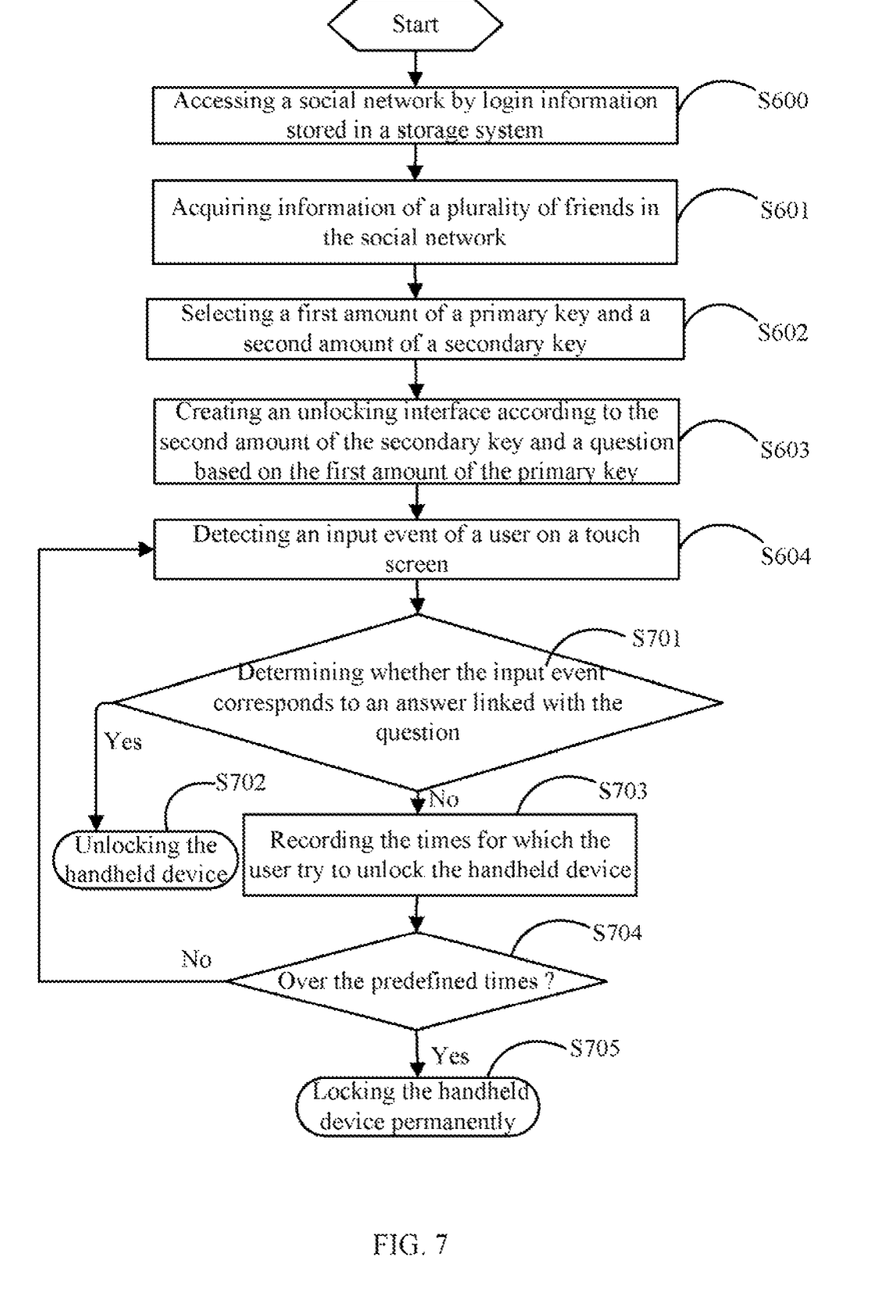
FIG. 7 is a flowchart of another embodiment of a method for unlocking a handheld device.

FIG. 7 is a flowchart of another embodiment of a method for unlocking a handheld device. FIG. 7 deletes S605 and differs from FIG. 6 in block S701-S705. In S701, The determining module 14 determines whether the input event corresponds to an answer linked with the question. If the input event corresponds to the answer, block S702 is implemented and the transitioning module 15 transitions the handheld device from a lock state to an unlock state. Otherwise, block S703 is implemented and the processor 16 records the times for which a user try to unlock the handheld device 10, and the unlocking interface creating module 12 creates a new unlocking interface. In block S704, the determining module determines that the user has failed over the predefined times, and the transitioning module 15 locks the handheld device 10 permanently in block S705.

The present disclosure, using the information of the social network 20, creates questions and answers at random to unlock the handheld device 10. As a result, a user can unlock the handheld device 10 safely and easily.

What is claimed is:

1. A method for unlocking a handheld device with a touch screen, comprising:
   storing login information of a social network in a storage system of the handheld device;
   accessing the social network by the login information stored in the storage system;
   acquiring information of a plurality of friends from the social network to store in the storage system, wherein information of one of the plurality of friends comprises a primary key and a secondary key;
   selecting a first amount of the primary key and a second amount of the secondary key from the storage system;
   creating an unlocking interface on the touch screen according to the second amount of the secondary key and a question based on the first amount of the primary key;
   detecting an input event of a user on the unlocking interface;
   determining whether the input event corresponds to an answer linked with the question; and
   transitioning the handheld device from a lock state to an unlock state upon the condition that the input event corresponds to the answer.

2. The method as claimed in claim 1, wherein the primary key is selected from the group comprising a photo and a video uploaded by the one of the plurality of friends, the name, messages and description related to the one of the plurality of friends, and the secondary key is selected from the group at least comprising an image of the one of the plurality of friends.

3. The method as claimed in claim 1, wherein the first amount is one and the second is more than one, and selecting the first amount of the primary key and the second amount of the secondary key from the storage system comprises:
   selecting one primary key of the one of the plurality of friends; and
   selecting one secondary key related to the one of the plurality of friends and at least one secondary key unrelated to the one of the plurality of friends.

4. The method as claimed in claim 3, wherein the one primary key is the name of the one of the plurality of friends, and the more than one secondary key comprises one image related and at least one image unrelated to the one of the plurality of friends, and the question refers to selecting one of the images corresponding to the name of the one of the plurality of friends, and when the selected image corresponds to the name, the handheld device determines that the input event corresponds to the answer linked with the question.

5. The method as claimed in claim 3, the one primary key is a photo uploaded by the one of the plurality of friends, and the more than one secondary key comprises images of the one of the plurality of friends and other friends in the social network, and the question refers to selecting an image corresponding to the photo of the one of the plurality of friends, and when the selected image corresponds to the photo of the one of the plurality of friends, the handheld device determines that the input event corresponds to the answer linked with the question.

6. The method as claimed in claim 3, wherein the one primary key is the name of the one of the plurality of friends, and the more than one secondary key comprises group photos of the one of the plurality of friends and other friends in the social network, and the question refers to selecting an image corresponding to the name of the one of the plurality of friends from one of the group photos, and when the selected image corresponds to the name, the handheld device determines that the input event corresponds to the answer linked with the question.

7. The method as claimed in claim 1, wherein both the first amount and the second mount are more than one, and selecting the first amount of the primary key and the second amount of the secondary key from the storage system further comprises:
   selecting more than one primary key of more than one friend stored in the storage system; and
   selecting more than one secondary key corresponds to the more than one friend.

8. The method as claimed in claim 7, wherein the more than one primary key comprises the names of X, Y and Z, and the more than one secondary key comprises images of X, Y and Z, and the question refers to clicking the images in the sequence of X, Y and Z, wherein when the user clicks the images in the sequence of X, Y and Z, the handheld device determines that the input event corresponds to the answer linked with the question.

9. The method as claimed in claim 1, further comprising:
   keeping the handheld device in the lock state if the input event of the user does not correspond to the answer.

10. The method as claimed in claim 9, further comprising:
    creating a new unlocking interface;
    detecting a new input event of the user on the new unlocking interface;
    determining whether the new input event corresponds to an answer linked with a question on the new unlocking interface; and
    locking the handheld device if the user has failed over a predefined times.

11. A handheld device, comprising:
    at least one processor;
    a touch screen displaying an unlocking interface;
    a storage system storing login information of a social network and one or more programs that are executed by the at least one processor, the one or more programs comprising:
       an acquiring module, accessing the social network by the login information stored in the storage system and acquiring information of a plurality of friends in the social network, wherein information of one of the plurality of friends comprises a primary key and a secondary key;
       an unlocking interface creating module, selecting a first amount of the primary key and a second amount of the secondary key from the storage system and creating the unlocking interface on the touch screen according to the second amount of the secondary key and a question based on the first amount of the primary key;

a detecting module, detecting an input event of a user on the unlocking interface;

a determining module, determining whether the input event corresponds to an answer linked with the question;

a transitioning module, transitioning the handheld device from a lock state to an unlock state upon the condition that the input event corresponds to the answer.

12. The handheld device as claimed in claim 11, wherein the primary key is selected from the group comprising a photo and a video uploaded by the one of the plurality of friends, the name, messages and description related to the one of the plurality of friends, and the secondary key is selected from the group at least comprising an image of the one of the plurality of friends.

13. The handheld device as claimed in claim 11, wherein the first amount is one and the second amount is more than one, and the unlocking interface creating module selects one primary key of the one of the plurality of friends and selects one secondary key related to the one of the plurality of friends and at least one secondary key unrelated to the one of the plurality of friends.

14. The handheld device as claimed in claim 11, wherein both the first amount and the second mount are more than one, and the unlocking interface creating module selects more than one primary key of more than one friend stored in the storage system and selects more than one secondary key corresponds to the more than one friend.

15. The handheld device as claimed in claim 11, wherein the transitioning module keeps the handheld device in the lock state if the determining module determines that the input event of the user does not correspond to the answer.

16. The handheld device as claimed in claim 15, wherein the unlocking interface creating module creates a new unlocking interface, and the transitioning module locks the handheld device if the determining module determines that the user has failed over a predefined times.

* * * * *